(12) United States Patent
Kato (10) Patent No.: US 8,041,226 B2
(45) Date of Patent: Oct. 18, 2011

(54) OPTICAL TRANSCEIVER WITH EQUALIZING FUNCTION AND A METHOD TO SETUP THE OPTICAL TRANSCEIVER

(75) Inventor: Takatoshi Kato, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 523 days.

(21) Appl. No.: 12/180,688

(22) Filed: Jul. 28, 2008

(65) Prior Publication Data

US 2009/0034981 A1 Feb. 5, 2009

(30) Foreign Application Priority Data

Aug. 3, 2007 (JP) .................................. 2007-203516

(51) Int. Cl.
*H04B 10/00* (2006.01)
(52) U.S. Cl. ........ 398/136; 398/135; 398/137; 398/139; 398/164; 398/193; 398/208; 398/159; 398/158; 398/162; 385/88; 385/89; 385/90; 385/92; 385/93; 375/232; 375/233; 375/234
(58) Field of Classification Search .................. 398/135, 398/136, 137, 138, 139, 140, 141, 158, 159, 398/160, 155, 154, 164, 79, 81, 182, 183, 398/193, 194, 192, 202, 208, 209, 128, 130, 398/149, 161, 33, 25, 26, 27; 385/88, 89, 385/90, 92, 93, 24, 14, 15; 375/232, 233, 375/234, 219, 350, 229, 316
See application file for complete search history.

(56) References Cited

U.S. PATENT DOCUMENTS

| 7,147,387 B2 | 12/2006 | Aronson et al. |
| 2004/0151073 A1* | 8/2004 | Preisach ....................... 368/110 |
| 2008/0107423 A1* | 5/2008 | Lee et al. ...................... 398/136 |

OTHER PUBLICATIONS

Kim Roberts et al., "Electronic Precompensation of Optical Nonlinearity", IEEE Photonics Technology Letters, vol. 18, No. 2, pp. 403-405, Jan. 15, 2006.
Henning Bulow et al., "Electronic Equalization of Transmission Impairments", Optical Fiber Conference, OFC/2002/Tuesday Morning, pp. 24-25, Mar. 19, 2002.

* cited by examiner

*Primary Examiner* — Hanh Phan
(74) *Attorney, Agent, or Firm* — Venable LLP; Michael A. Satori; Leigh D. Thelen (57) ABSTRACT

An optical transceiver and a method to setup the optical transceiver are disclosed, where the transceiver has a function to compensate the distortion and the dispersion due to the limited bandwidth of the electrical signal line, that of the active devices, and that of the optical fiber. The optical transceiver comprises a transmitter with an equalizer unit and a receiver also with an equalizer unit. The equalizer unit in the transmitter compensates the distortion due to the limited bandwidth of the transmission lines for the electrical signal and that of the semiconductor active device, while, the equalizer unit in the receiver compensates the dispersion due to the limited bandwidth of the optical fiber.

7 Claims, 6 Drawing Sheets

OPTICAL TRANSCEIVER WITH EQUALIZING FUNCTION AND A METHOD TO SETUP THE OPTICAL TRANSCEIVER

BACKGROUND OF THE INVENTION

1. Field of the Invention

The present invention relates to an optical transceiver that transmits and receives optical signals.

2. Related Prior Arts

One optical communication system, whose distance between the nearest terminal is shorter than several kilometer and transmission speed is relatively slow, below several hundreds of mega-bps, often uses multimode optical fibers and a light-emitting diode (LED) as optical sources. On the other hand, another type of the optical communication system with a long distance and a high transmission speed uses single mode fibers and a laser diode as optical sources.

The FDDI standard, which is one of international standards of the optical communication and rules a distance of 2 km and a transmission speed of 125 Mbps, has adopted the multimode fiber with a core diameter of 62.5 μm and a graded index profile. Another standard of the optical communication system, such as the SDH (Synchronous Digital Hierarchy) whose transmission speeds are 622 Mbps, 2.5 Gbps, 10 Gbps and so on, or the optical Ethernet with transmission speed faster than 1 Gbps, has adopted the single mode fiber and the laser diode (LD) as the optical source.

Recently, it has been requested that existing multimode fibers could be applied to the high speed optical communication system using the LD as the signal source. Because of its larger core diameter, the multimode fiber is easily coupled with the optical source, and consequently, some misalignment between the core and the light source does not result in the larger coupling loss, which makes it easy to produce an optical connector and reduces the production cost. On the other hand, the multimode fiber easily distorts the optical signal transmitted therein because the fiber may transmit a plurality of optical modes and respective modes show different transmission speed within the fiber, which is called as the dispersion. Thus, it has been unable for the multimode fiber to transmit a high speed optical signal.

In order to compensate the dispersion within the multimode fiber, an electrical equalizing process carried out in the optical receiver is known in the field. H. Bulow, et. al has presented this electrical equalizing process in the Optical Fiber Conference in 2002. The electrical equalizing process may be carried out by one type of digital filters with a plurality of delay blocks, a plurality of multipliers, an adder and some control units. The electrical equalizing may realize the high speed transmission over 10 Gbps.

The U.S. Pat. No. 7,147,387 has disclosed another technique in addition to the electrical equalizing in the receiver, where the transmitter compensates the dispersion occurred within the optical fiber, which is called as pre-emphasis. K. Roberts, et al has reported another technique in IEEE Photonics Technology Letters, volume 12 (2), pages 403-405 (2006), that, estimating the dispersion occurred within the optical fiber, the transmitter outputs a pre-distorted optical signal based on the estimation so as to compensate the dispersion of the optical fiber, which is called as the pre-compensation.

In the high speed transmission over 10 Gbps, the frequency bandwidth of the electrical signal lines in the transmitter and the receiver and that of the LD and the PD become a great factor to distort the signal waveform in addition to the dispersion of the optical fiber regardless of single mode or multimode. The electrical equalizing provided only in the receiver sometimes lacks its ability to compensate the distortion due to a limited frequency bandwidth of the electrical signal lines and that of the semiconductor devices. The semiconductor active devices with lower cost thereof that are positively applied in the optical system using the multimode fiber tend to show less bandwidth. Although the prior US patent mentioned above has disclosed the pre-emphasis technique where the optical output from the transmitter is pre-distorted so as to compensate the distortion and the dispersion of the transmission line as monitoring the output waveform from the transmitter, they have not described nor mentioned the relation between the pre-emphasized transmitter and the receiver, and between the pre-emphasized transmitter and the optical fiber.

Moreover, the pre-compensation technique reported by Roberts, et. al is necessary to compensate whole distortion and dispersion due to the signal line, the active devices and the optical fiber only by the pre-compensation, which inevitably requires a large dynamic range of the pre-compensation. A large power is necessary in the calculation to get optimal conditions, which inevitably brings a hard thermal condition for the devices installed within the transceiver.

SUMMARY OF THE INVENTION

Thus, the present invention is to solve the subjects above, to provide an optical transceiver that is able to compensate the distortion and the dispersion appeared in the high speed transmission due to the electrical signal lines, the semiconductor active devices, and the optical fiber, and to provide a method to setup the optical transceiver.

One aspect of the present invention relates to an optical transceiver that comprises a transmitter and a receiver. The transmitter includes an LD for emitting a transmitted optical signal to a first optical fiber and a first equalizer unit for outputting a first electrical signal equalized from a transmitted electrical signal input to the transmitter. The receiver includes a PD for converting a received optical signal provided from a second optical fiber to a second electrical signal, and a second equalizer unit that outputs a received electrical signal equalized from the second electrical signal output from the PD to an outside of the transceiver. A feature of the transceiver according to the present invention is that the first equalizer unit in the transmitter compensates the frequency distortion contained in the first electrical signal output from the first equalizer unit, the frequency distortion contained in the second electrical signal output from the PD and the frequency distortion due to the LD and the PD, while, the second equalizer unit in the receiver compensates the dispersion of the second optical fiber coupled with the receiver.

Because the transceiver provides the first equalizer unit that compensates only the distortion due to the limited bandwidth of the electrical signal lines and that of the active devices, namely, the LD and the PD, independent of the second equalizer unit in the receiver, the dynamic range of the equalizing for the dispersion of the optical fiber, which is performed solely by the second equalizer unit, may be enhanced.

Another aspect of the present invention relates to a method to setup the optical transceiver that provides two equalizer unit, one of which, the first equalizer unit, is for equalizing the distortion due to the limited bandwidth of the signal lines and that of the active devices, the LD and the PD, the other of which, the second equalizer unit, is for equalizing the dispersion of the optical fiber coupled with the transceiver. The method according to the invention comprises steps of: (a) activating the LD in the transmitter with halting the first equalizer unit; (b) optically coupling the LD with the PD in the receiver by an optical fiber that has substantially no dispersion; (c) equalizing the output of the PD by activating the second equalizer unit, which may determine the tap coefficients of the second equalizer unit; and (d) setting these tap coefficients thus determined by the second equalizer unit in the tap coefficients of the first equalizer unit.

In the step (b), the receiver including the PD may be built in the same transceiver that builds the transmitter including the LD, or may be built in a transceiver different from, but has the same configuration with that builds the transmitter.

DESCRIPTION OF PREFERRED EMBODIMENTS

Next, preferred embodiments of the present invention will be described as referring to accompany drawings. In the description of the drawings, the same numerals or the same symbols will refer to the same elements without overlapping explanations.

First Embodiment

Figure 1:
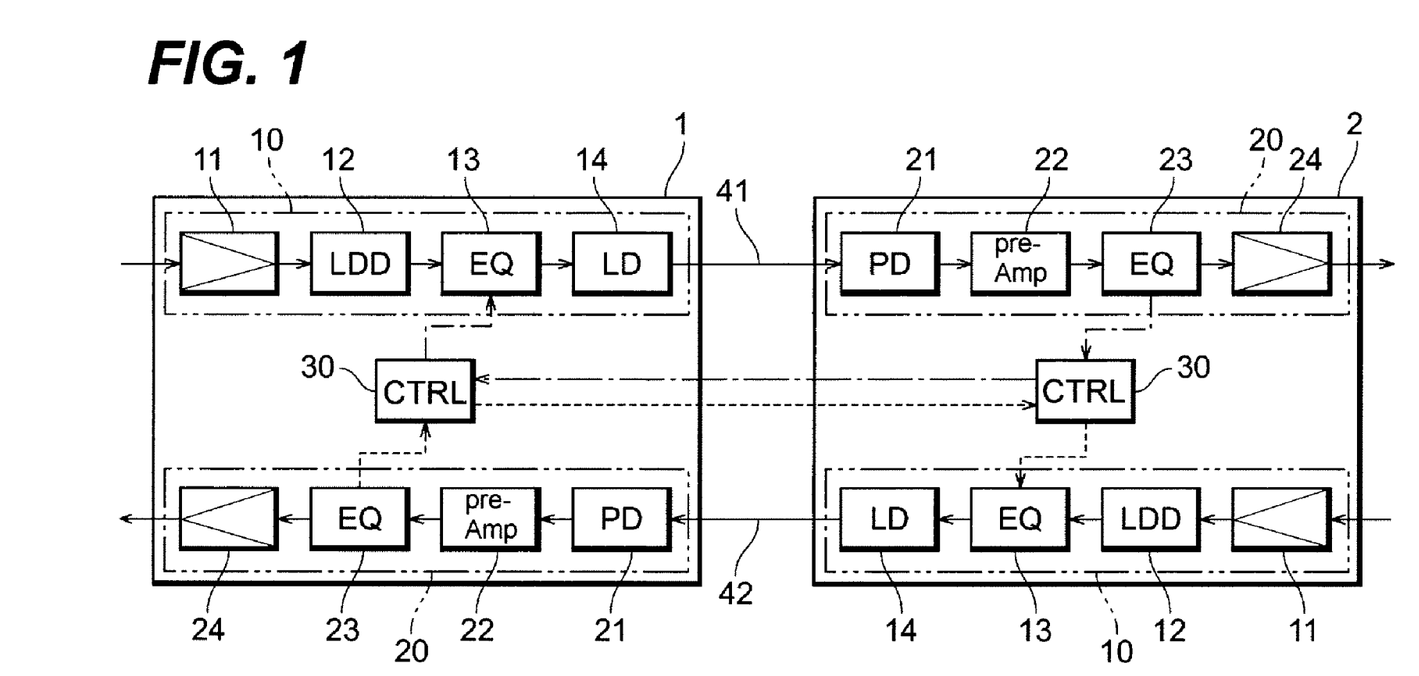
FIG. 1 illustrates a configuration of an optical transceiver and a method to setup the optical transceiver according to the first embodiment of the invention.

The first embodiment of the invention will be described. FIG. 1 illustrates a configuration of an optical transceiver according to the first embodiment of the invention and a method to setup the transceiver. FIG. 1 includes first and second transceivers, 1 and 2, each having the same configuration with respect to the other. That is, the optical transceiver, 1 and 2, include a transmitter 10, a receiver 20 and a control unit (CTRL) 30.

The transmitter 10 comprises a reshaping unit 11, a laser diode driver unit (hereafter denoted as LDD unit) 12, an equalizer unit (hereafter denoted as EQ unit) 13 for the transmitting signal, and a laser diode (hereafter denoted as LD) 14. The reshaping unit 11, by receiving an input signal, reshapes its waveform and transmits the reshaped signal to the LDD 12. The LDD 12 generates a driving signal to drive the LD 14 based on the reshaped signal from the reshaping unit 11. The EQ unit 13 equalizes the signal from the LDD 12 and transmits the equalized signal to the LD 14.

The receiver 20 comprises a photodiode (hereafter denoted as PD) 21, a preamplifier 22, an EQ unit 23, and a reshaping unit 24. The PD 21 receives signal light from the optical fiber 42, generates a photocurrent based on the signal light, and transmits this photocurrent to the preamplifier 22. The preamplifier 22 converts the photocurrent into a voltage signal and transmits this voltage signal to the EQ unit 23. The EQ unit 23 equalizes the voltage signal and transmits an equalized signal to the reshaping unit 24 to recover clock and data components from the equalized signal.

The LD 14 in the first transceiver 1 is coupled with the PD 21 in the second transceiver through the optical fiber 41, while, the LD 14 in the second transceiver 2 is coupled with the PD 21 in the first transceiver through the other optical fiber 42. The control unit 30 in respective transceivers, 1 and 2, controls two EQ units, 13 and 23, for the transmitting signal and the receiving signal, respectively.

Figure 2:
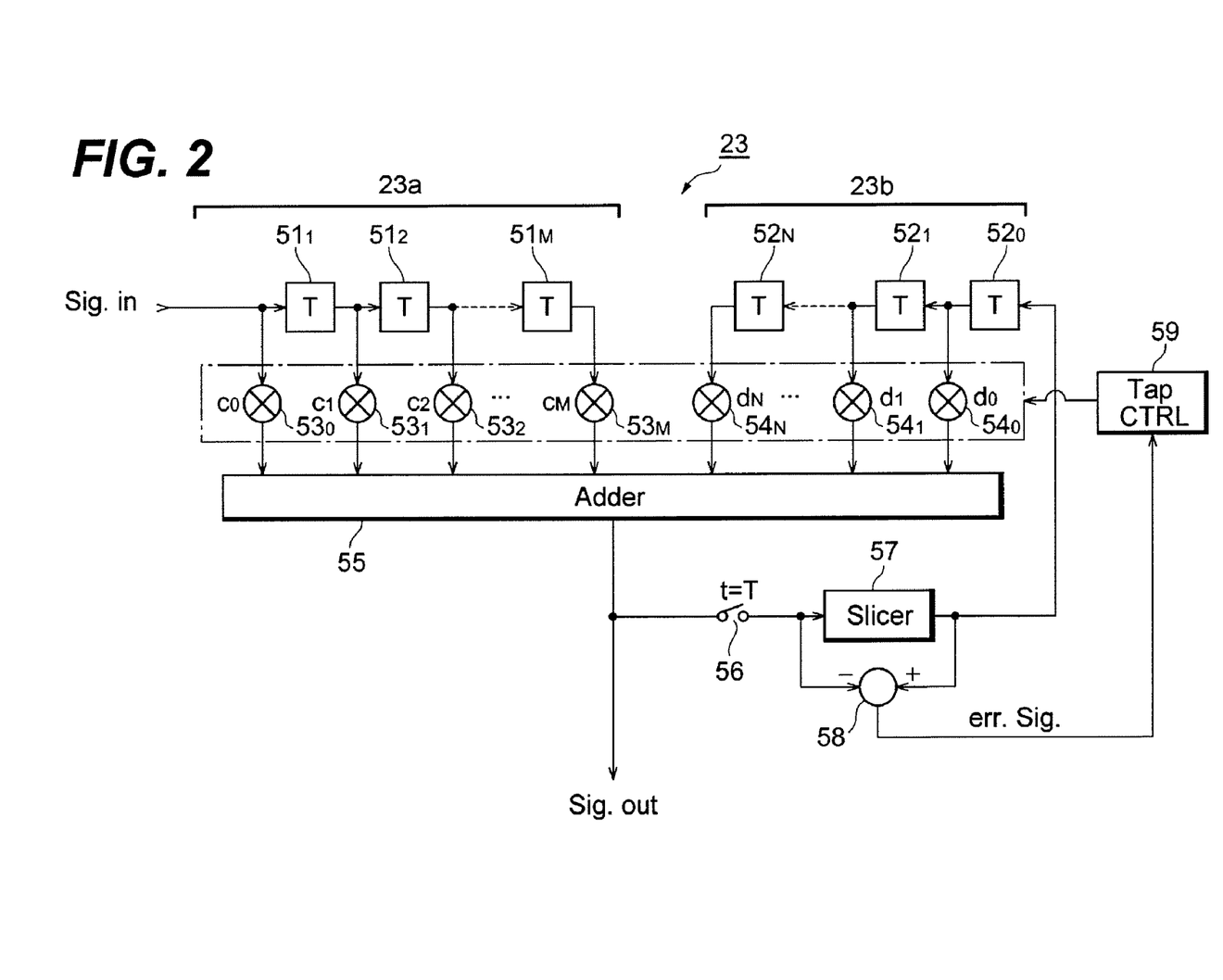
FIG. 2 illustrates an equalizer unit for the receiver installed within the optical transceiver of the first embodiment.

FIG. 2 is a block diagram of the EQ unit 23 for the receiving signal. The EQ unit 23 comprises M units of delay blocks, $51_1$ to $51_M$, N+1 units of delay blocks, $52_0$ to $52_N$, M+1 units of multipliers, $53_0$ to $53_M$, N+1 units of multipliers, $54_0$ to $54_N$, an adder 55, a sampling switch 56, a slicer 57, a comparator 58, and a tap controller 59. The numerals M and N are integers greater than 1, while, m and n appeared in the following explanation are an integer greater than 1 and smaller than M and an integer greater than 0 and smaller than N, respectively.

The delay blocks, $51_1$ to $51_M$, which are connected in series in this order, each delays the input signal from the upstream block by a time T. The other delay blocks, $52_0$ to $52_N$, are also connected in series in this order, each delays the input signal from the upstream block by the time T, where the signal originally comes from the slicer 57. The fundamental delay time T corresponds to the duration of the clock signal contained in the original signal received by the reshaping unit 11.

The first multiplier $53_0$ multiplies the input signal by a first tap coefficient $c_0$ and transmits thus multiplied signal to the adder 55, while, an intermediate multiplier $53_m$ multiplies the signal come from the $m_{th}$ delay block $51_m$ by the tap coefficient cm and transmits the multiplied result to the adder 55. The multiplier $54n$ multiplies the signal come from the delay block $52_n$ by the tap coefficient $d_n$ and transmits the multiplied signal to the adder 55. The adder 55 sums up the outputs from the multipliers $53_0$ to $53_M$ and the outputs from the multipliers $54_0$ to $54_N$.

The sampling switch 56 samples the output of the adder 55 by a clock period T and holds the sampled output to transmit the slicer 57. The slicer 57 compares the output of the sampling switch 56 with a preset threshold and transmits a digital signal that corresponds to the compared result to the first delay unit $52_0$. The subtractor 58 subtracts the output of the slicer 57 from the output of the sampling switch 56 and transmits a difference between these two signals, the outputs of the slicer 57 and that of the sampling switch 56, to the tap controller 59. The tap controller 59 adjusts the tap coefficients, $c_0$ to $c_M$ and $d_0$ to $d_N$, so as to minimize the different of two signals above described.

Thus, the delay blocks, $51_1$ to $51_M$, the multipliers, $53_0$ to $53_M$ and the adder 55 constitute the feed-forward unit 23a, while, the delay blocks, $52_0$ to $52_N$, the multipliers, $54_0$ to $54_N$, the adder 55, the sampling switch 56 and the slicer 57 constitute the feedback unit 23b. The EQ unit 23 may provide the feed forward unit alone to simplify the configuration of the transceiver.

The EQ unit 23, which is one type of the digital filter and often called as the transversal filter, may dynamically adjust its frequency response by varying the tap coefficients, $c_0$ to $c_M$ and $d_0$ to $d_N$, so as to minimize the output of the subtractor unit 58; accordingly, even a distorted signal is input to the receiver, or, an electrical signal converted from an optical signal transmitted through the optical fiber is distorted by the dispersion inherently attributed to the optical fiber, the EQ unit 23 may dynamically recover the original signal by adjusting the tap coefficient automatically.

Figure 3:
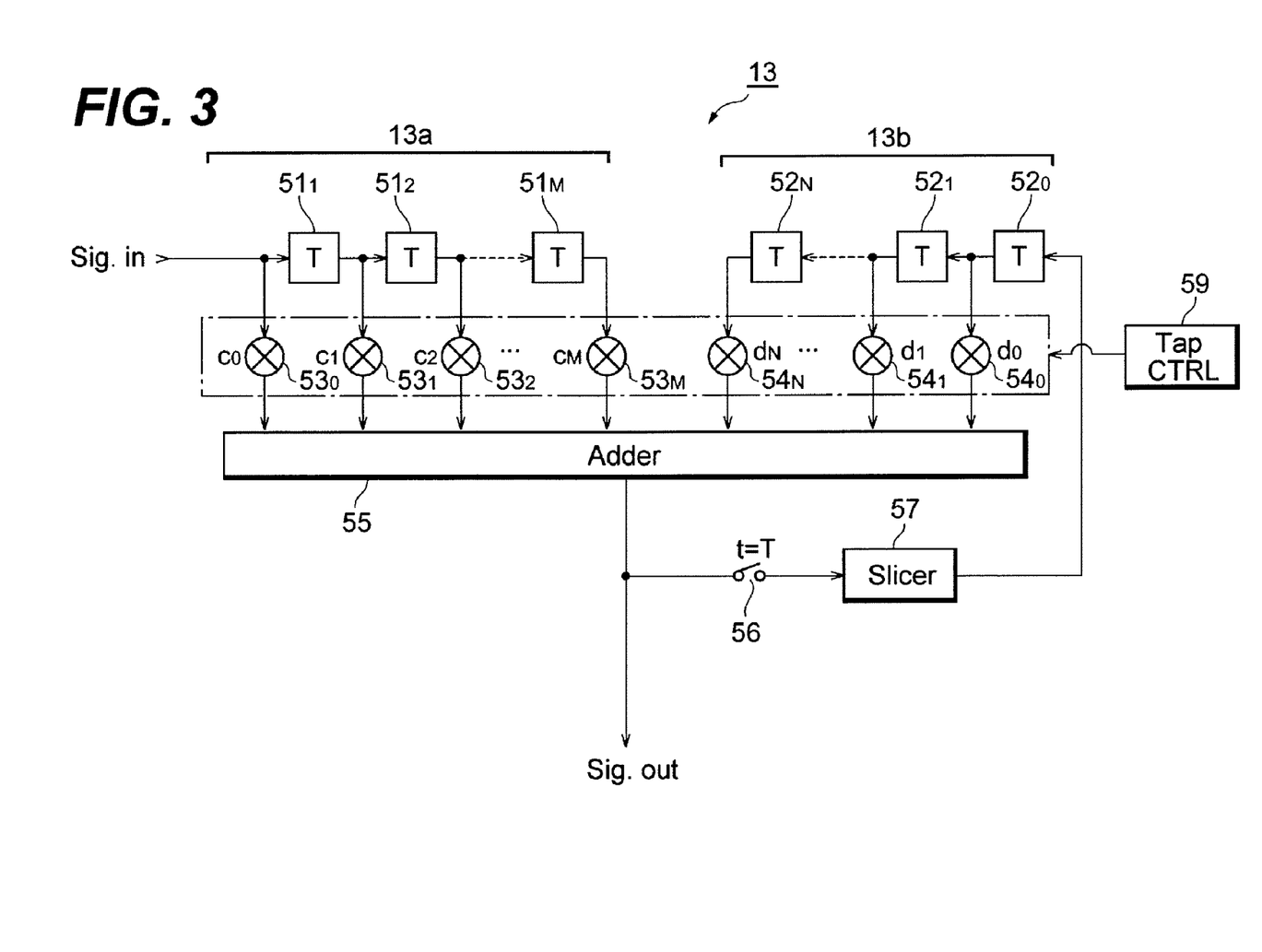
FIG. 3 illustrates an equalizer unit for the transmitter installed within the optical transceiver of the first embodiment.

FIG. 3 illustrates the EQ unit 13 in the transmitter 10. Comparing with the other EQ unit 23 previously described and shown in FIG. 2, this EQ unit 13 may be distinguished in a point that the EQ unit 13 does not provide the subtractor 58; accordingly, this EQ unit 13 is unnecessary to adjust the tap coefficients, $c_0$ to $c_M$ and $d_0$ to $d_N$, dynamically and may fix the tap coefficients. The EQ unit 13 may provide the feed-forward unit 13a alone for the simplification of the transceiver 1.

The control unit 30 controls the tap coefficients of the EQ unit 23 in the receiver 20 and, in addition to this procedure, sets the tap coefficients of the EQ unit 13 in the transmitter 10 based on the tap coefficients of the EQ unit 23 of its owned transceiver 1 or those of an EQ unit in a transceiver independent of but having the same configuration with the own transceiver. The control unit 30 may be built in the tap controller 59 in the EQ unit 13, or in the tap controller 59 in the EQ unit 23.

Next, a protocol to vary the tap coefficients of the EQ unit 13 and the other EQ unit 23 will be described. In the first embodiment, the controller 30 adjusts the tap coefficients of the EQ unit 23 in the second transceiver 2, subsequently, the tap coefficients of the EQ unit 13 in the first transceiver 1 is sets based on the tap coefficients of the EQ unit 23 in the second transceiver 2. Moreover, the tap coefficients of the EQ unit 23 in the first transceiver 1 is firstly set, and the tap coefficients of the EQ unit 13 in the second transceiver 2 is subsequently set based on the tap coefficients of the EQ unit in the first transceiver 1.

The first and second transceivers, 1 and 2, with the same configuration to each other are optically coupled with optical fibers, 41 and 42, having substantially no dispersion, that is, these fibers have a characteristic of relatively small accumulated dispersion and a short length. The tap coefficients, $c_0$ to $c_M$, of the EQ unit 13 in the first transceiver 1 are set such that only one of them is equal to 1, while, the others are set to 0 in the feed forward unit 13a, and all tap coefficients, $d_0$ to $d_N$ are set to 0 in the feedback unit 13b to halt the equalization. Under a condition that the transmitter 10 in the first transceiver 1 outputs an optical signal to the receiver 20 in the second transceiver 2 through the optical fiber 41, the EQ unit 23 in the second transceiver 2 carries out the equalization to adjust the tap coefficients, $c_0$ to $c_M$ and $d_0$ to $d_M$, of the EQ unit 23 in the second transceiver 2.

Deciding the practical values for the tap coefficients, $c_0$ to $c_M$ and $d_0$ to $d_M$, in the second transceiver 2, these coefficients are set in the EQ unit 13 of the first transceiver 1 through the controller 30 in the second transceiver 2 and the controller 30 in the first transceiver 1. Thus, under the condition that two transceivers, 1 and 2, are coupled with the optical fiber 42 with substantially no dispersion, the EQ unit 23 in the second transceiver 2 may compensate the distortion due to the limited frequency bandwidth of the electrical signal lines, that of the LD 14 itself in the transmitter 10 of the first transceiver 1, and may be also compensated those appeared in the electrical signal lines and the PD 21 itself in the receiver 20 of the second transceiver 2.

Similarly, coupling the transmitter 10 in the second transceiver 2 with the receiver 20 in the first transceiver 1 with an optical fiber with substantially no dispersion, and setting the tap coefficients, $c_0$ to $c_M$ and $d_0$ to $d_N$, of the EQ unit 13 of the second transceiver 2 determined by the EQ unit 23 in the first transceiver 1, the distortion due to the limited frequency bandwidth of the electrical signal lines and that of the LD 14 it self in the second transceiver 2, and that of the electrical signal lines and the PD 21 in the first transceiver 1 may be compensated.

After setting the tap coefficients of the EQ units 13 in the transmitter 10 of both transceivers, 1 and 2, optical fibers used in the practical optical communication system connect the first transceiver 1 with the second transceiver 2. Under such a condition, the EQ units 23 in respective transceivers only have to compensate the dispersion due to the optical fiber without taking the distortion of the semiconductor optical devices, the LD and the PD, and the electrical signal lines into account.

According to the method described above for compensating the distortion or the dispersion of the optical system including the optical fiber, the EQ unit 13 in the transmitter 10 may compensate the distortion due to limited frequency bandwidth of the LD 14 and the PD 21, and that of the electrical signal lines, while, the dispersion of the optical fiber may be compensated by the EQ unit 23 in the receiver 20. Thus, because the function to compensate the distortion and the dispersion is divided into two EQ units, 13 and 23, the dynamic range of the compensation may be enhanced, and the system with the function above may recover a seriously degraded signal and may follow an optical communication with further transmission speed.

Next the method according to the embodiment described above will be compared, by the numerical calculation, with a method that omits the EQ unit 13 of the transmitter. In the comparison, several conditions are assumed that (1) both EQ units, 13 and 23, provide only the feed forward unit, 13a or 23a, without the feedback unit, 13b and 23b; (2) the number of the multipliers is assumed to be 9, M=8; (3) the frequency bandwidth of the electrical signal line is 5 GHz; (4) the transmission bandwidth of the optical fiber connecting two transceivers is 2.6 GHz; and the bit rate of the signal to be transmitted is 10 Gbps.

Figure 5A:
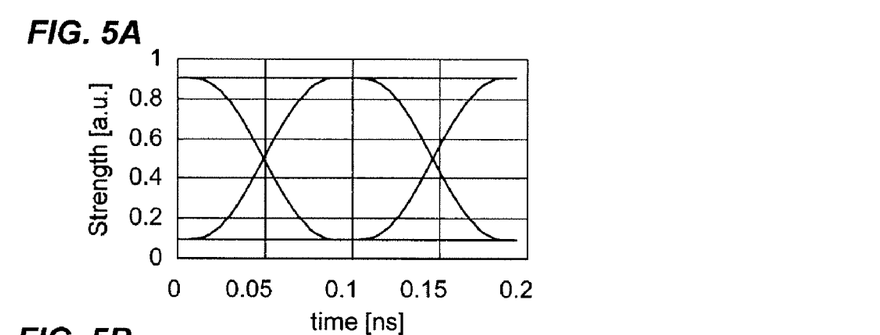
FIGS. 5A to 5D show signal waveforms monitored at various stages in the optical transceiver without the equalizer unit of the transmitter.
Figure 5B:
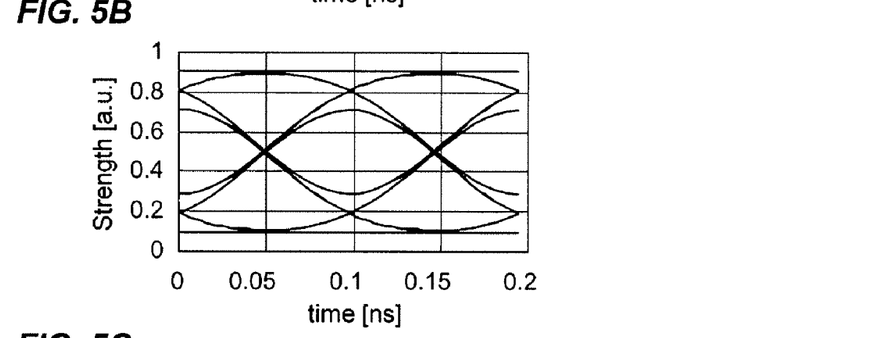
Figure 5C:
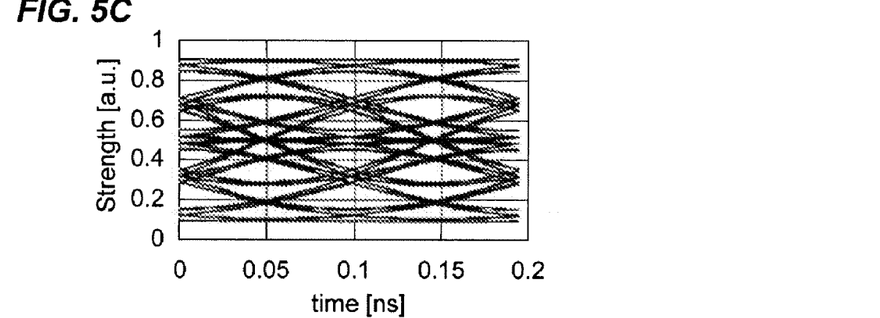
Figure 5D:
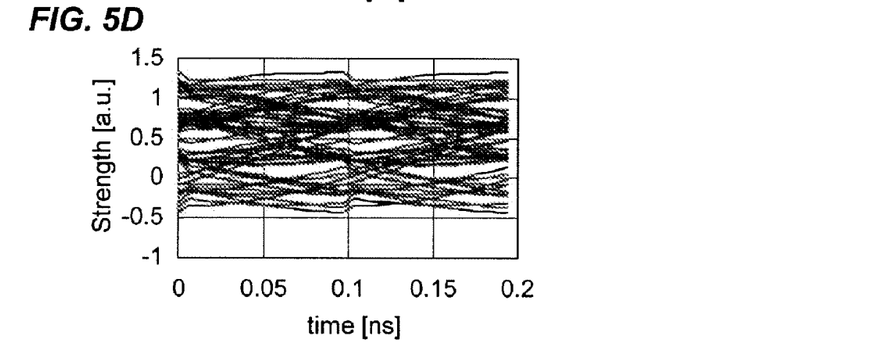

FIGS. from 5A to 5D show, by the eye diagram, the waveforms at various stages in the transceiver without the EQ unit 13 of the transmitter 10. FIG. 5A is the original signal input into the transmitter 10, which appears no distortion and no dispersion. FIG. 5B is the output of the preamplifier 22 when the receiver 20 is coupled with the transmitter 10 by an optical fiber with substantially no dispersion, while, FIG. 5C is the output of the preamplifier 22 when the receiver is coupled with the transmitter by an optical fiber whose transmission bandwidth is 2.6 GHz. FIG. 5D is the output of the EQ unit 23 of the receiver 20 when the optical fiber with the limited bandwidth (2.6 GHz) couples the transmitter 10 with the receiver 20.

Even the original signal has no distortion as shown in FIG. 5A, the output of the preamplifier 22 appears the influence of the limited bandwidth of the signal line, which is assumed to be 5 GHz, as shown in FIG. 5B. Moreover, when the practical optical fiber with the substantial dispersion connects the receiver 20 with the transmitter 10, the output of the preamplifier 22 becomes greatly influenced by the dispersion of the optical fiber. Accordingly, even the EQ unit 23 of the receiver 20 equalizes or compensates this output of the preamplifier 22 shown in FIG. 5C, the signal is unable to be recovered as shown in FIG. 5D.

Figure 6A:
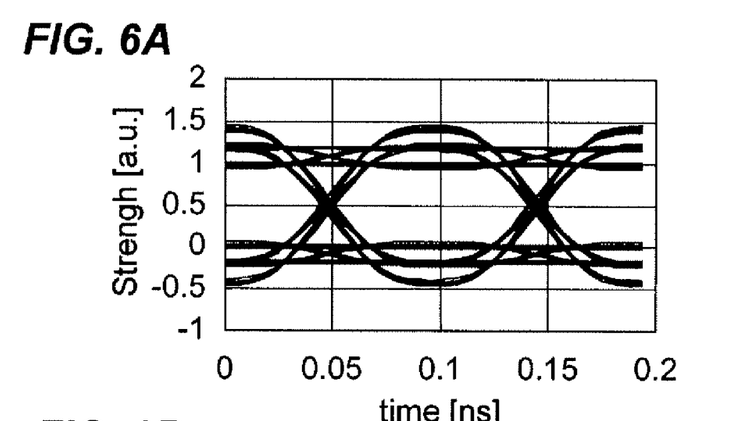
FIGS. 6A to 6C show signal wave forms monitored at various stages in the optical transceiver with the equalizer unit of the transmitter according to the present invention.

FIGS. from 6A to 6C show, by the eye diagram, the waveforms at various stages in the transceiver with the EQ unit 13 of the transmitter. The tap coefficients, $c_0$ to $c_8$, of the EQ unit 13, which are determined by the method described above, are 0.001, 0.007, 0.042, −0.270, 1.701, −0.286, 0.058, −0.008 and 0.001, respectively. FIG. 6A shows the output of the EQ unit 13 of the transmitter 10, FIG. 6B show the output of the preamplifier 22 of the receiver 20 when the receiver 20 is coupled with the optical fiber with the limited bandwidth of 2.6 GHz, and FIG. 6C shows the output of the EQ unit 23 of the receiver when the optical fiber with the limited bandwidth of 2.6 GHz connects the receiver 20 with the transmitter 10

Figure 6B:
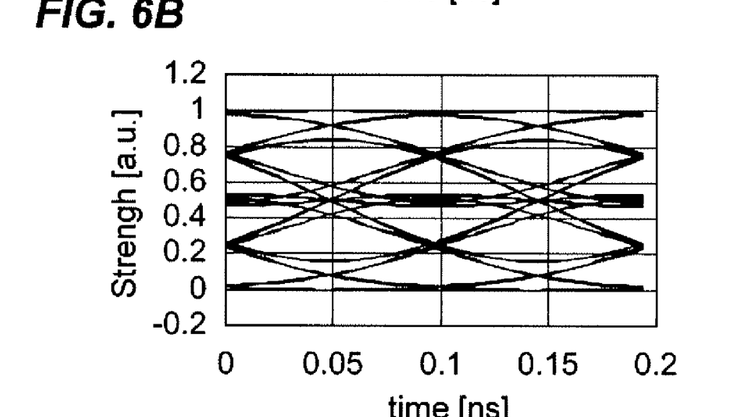
Figure 6C:
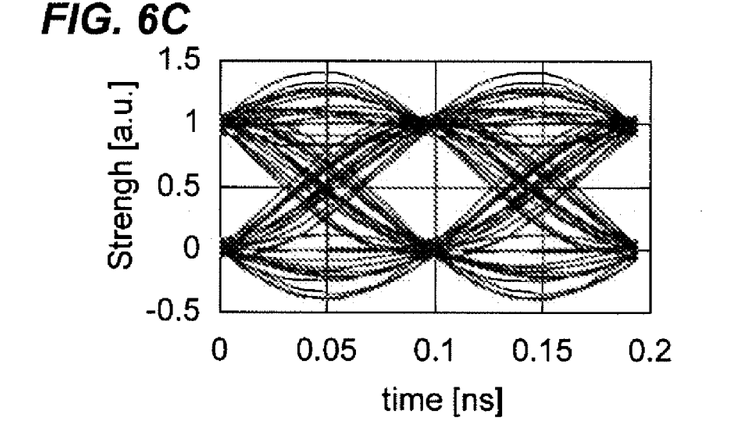

The output of the preamplifier 22 in the transceiver with the transmitter EQ unit 13 is also deformed due to the limited bandwidth (2.6 GHz) of the optical fiber as shown in FIG. 6B. However, comparing this output of the preamplifier 22 with that of the transceiver without the transmitter EQ unit 13, the transceiver according to the present invention effectively compensates the distortion of the signal lines in the transmitter 10 and the receiver 20 and that of the semiconductor devices, the LD 14 and the PD 21, by the EQ unit 13, the output of the EQ unit 23 may appear an enough eye, which means that the original signal can be recovered.

Second Embodiment

Figure 4:
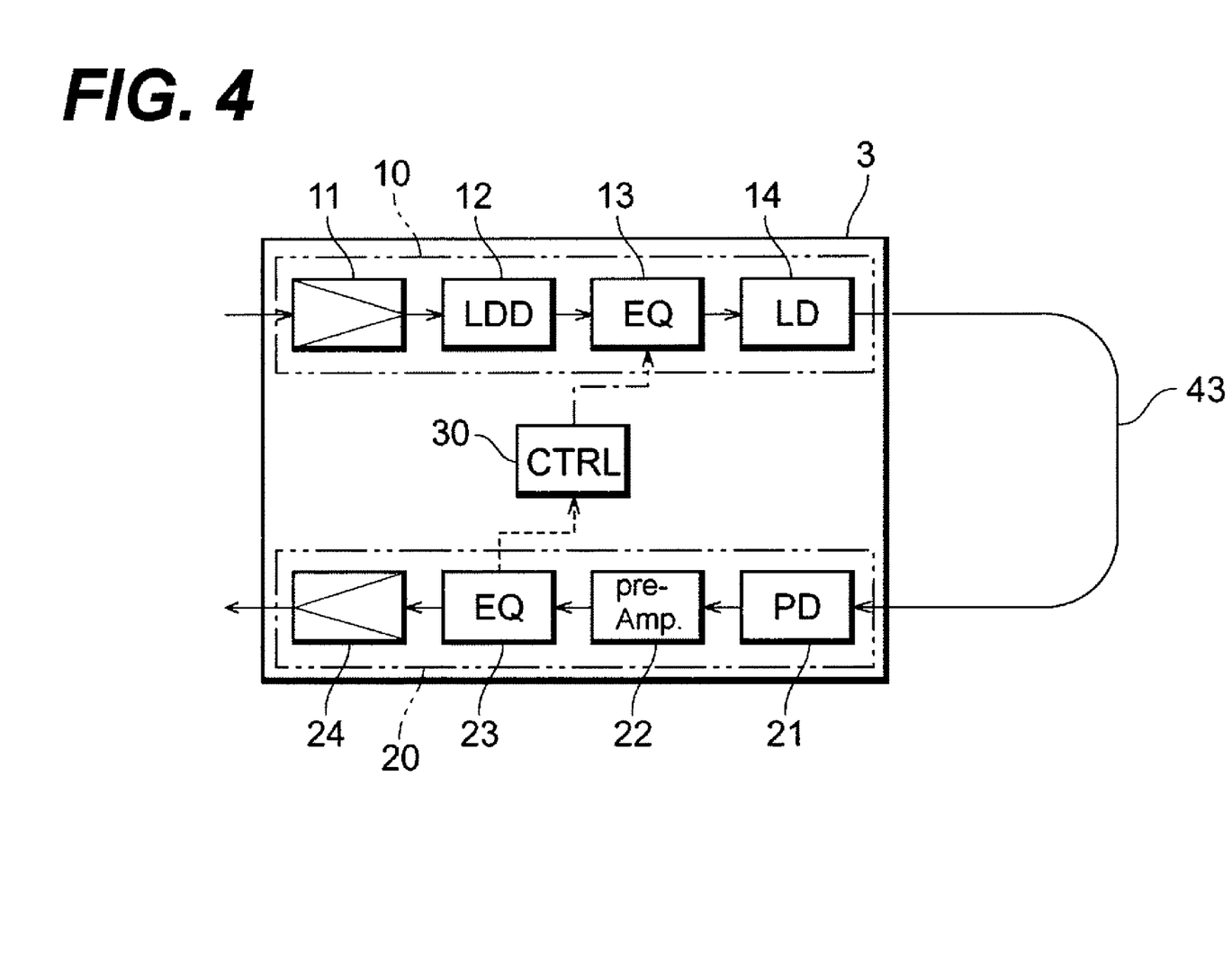
FIG. 4 illustrates a method to setup the optical transceiver according to the second embodiment of the invention.

Next, a second embodiment according to the invention will be described. FIG. 4 illustrates only one transceiver 3, which has the same configuration with the transceivers, 1 and 2, they are already described above, and respective units, 11 to 14 and 21 to 24, in the transceiver 3 are also same as those in the previous transceivers, 1 and 2. A feature of the transceiver 3 is that the controller 30 sets the tap coefficients of the EQ unit 23 in the receiver 20 and, based on these tap coefficients thus decided, the controller 30 sets the tap coefficients of the EQ unit 13 in the transmitter 10.

As shown in FIG. 4, the transceiver 3 firstly couples the transmitter 10 with its own receiver 20 by an optical fiber 43 with substantially no dispersion. Further, as described in the first embodiment, only one of the tap coefficients, $c_0$ to $c_M$, of the EQ unit 13 is set equal to 1, while, the other in the feed forward unit 13a are set to 0, and all tap coefficients, $d_0$ to $d_N$, in the feedback unit 13b are set to 0 to halt the feedback equalization. Then, the EQ unit 23 in the receiver 20 operates for the input optical signal that includes the distortion due to the electrical signal line with the limited bandwidth in the transmitter and receiver, and the limited frequency bandwidth of the LD 14 and the PD 21. Subsequently, the controller 30 sets the resultant tap coefficients, $c_0$ to $c_M$ and $d_0$ to $d_N$, thus determined by the EQ unit 23 to the EQ unit 13 of the transmitter 10.

The optical communication system provides a plurality of transceivers in respective nodes or terminals. Such transceivers generally have with the same configuration and the specification. Therefore, the protocol to set the tap coefficients determined by the receiver in its own transmitter becomes effective.

While the invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical transceiver, comprising:
a transmitter including a semiconductor laser diode for emitting a transmitted optical signal to a first optical fiber and a first equalizer unit for outputting to said laser diode a first electrical signal equalized from a transmitted electrical signal input to said transmitter; and
a receiver including a photodiode for converting a received optical signal provided from a second optical fiber to a second electrical signal, and a second equalizer unit for outputting a received electrical signal equalized from said second electrical signal output from said photodiode, wherein said first equalizer unit in said transmitter has a same configuration with said second equalizer unit in said receiver, and includes a plurality of delay blocks and a plurality of multiplier blocks each coupling with a corresponding delay block and multiplying an output from said corresponding delay block by a tap coefficient specific to each multiplier block, wherein said tap coefficients of said first equalizer unit are set based on tap coefficients of said second equalizer unit, wherein said first equalizer unit compensates frequency distortion contained in said first electrical signal, frequency distortion contained in said second electrical signal, and frequency distortion of said laser diode and said photodiode, and wherein said second equalizer unit compensates dispersion of said second optical fiber.

2. The optical transceiver according to claim 1,
wherein said first equalizer unit includes a feed forward unit alone.

3. The optical transceiver according to claim 1,
wherein said second equalizer unit includes a feed forward unit alone.

4. A method to setup an optical transceiver that comprises a transmitter and a receiver, said transmitter including a semiconductor laser diode and a first equalizer unit to drive said semiconductor laser diode, said receiver including a semiconductor photodiode and a second equalizer unit to equalize an output of said semiconductor photodiode, said first and second equalizer unit having a same configuration to each other, said method comprising steps of:

(a) activating said laser diode with halting said first equalizer unit;

(b) optically coupling said laser diode with said photodiode with an optical fiber showing substantially no dispersion;

(c) equalizing said output of said photodiode by operating said second equalizer unit in said receiver to determine tap coefficients of said second equalizer unit; and (d) setting tap coefficients determined by said second equalizer unit in said first equalizer unit.

5. The method according to claim 4,
wherein said first equalizer unit provides a feed forward unit alone, and
wherein said step to equalize said output of said photodiode is performed by said second equalizer unit only by a feed forward unit included in said second equalizer unit.

6. A method to setup an optical transceiver that comprises a transmitter and a receiver, said transmitter including a semiconductor laser diode and a first equalizer unit to drive said semiconductor laser diode, said method comprising steps of:

(a) activating said laser diode with halting said first equalizer unit;

(b) optically coupling said laser diode with a photodiode with an optical fiber showing substantially no dispersion, said photodiode being installed in another optical transceiver having a same configuration with said optical transceiver that installs said laser diode and compris ing said photodiode and a second equalizer unit to equalize an output of said photodiode;
(c) equalizing said output of said photodiode in said another optical transceiver by operating said second equalizer unit to determine tap coefficients of said second equalizer unit; and
(d) setting tap coefficients of said first equalizer unit by copying said tap coefficients of said second equalizer unit.

7. The method according to claim 6,
wherein said first equalizer unit provides a feed forward unit alone, and
wherein said step to equalize said output of said photodiode is performed by said second equalizer unit only by a feed forward unit included in said second equalizer unit.

\* \* \* \* \*